(12) United States Patent
Chang et al.

(10) Patent No.: US 12,380,543 B2
(45) Date of Patent: Aug. 5, 2025

(54) FOG DISCRIMINATION METHOD AND OPTICAL APPARATUS

(71) Applicant: Quanta Computer Inc., Taoyuan (TW)

(72) Inventors: Jung-Wen Chang, Taoyuan (TW); Chin-Kang Chang, Taoyuan (TW); Chao-Ching Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 329 days.

(21) Appl. No.: 18/315,018

(22) Filed: May 10, 2023

(65) Prior Publication Data

US 2024/0169503 A1    May 23, 2024

(30) Foreign Application Priority Data

Nov. 18, 2022 (TW) .................................. 111144174

(51) Int. Cl.
*G06T 5/80* (2024.01)
*G06T 5/50* (2006.01)

(52) U.S. Cl.
CPC .................. *G06T 5/80* (2024.01); *G06T 5/50* (2013.01); *G06T 2207/20076* (2013.01)

(58) Field of Classification Search
CPC ... G06T 5/80; G06T 5/50; G06T 2207/20076; G06T 2207/30168; G06T 7/0002; G06T 7/90; H04N 23/52
See application file for complete search history.

(56) References Cited

U.S. PATENT DOCUMENTS

| | | | | |
|---|---|---|---|---|
| 9,846,925 B2* | 12/2017 | Jeon | ........................... | G06T 5/90 |
| 12,284,727 B1* | 4/2025 | Johnson | ................... | H05B 3/84 |
| 2010/0040300 A1* | 2/2010 | Kang | ........................ | G06T 5/40 |
| | | | | 382/255 |
| 2015/0279011 A1* | 10/2015 | Jeon | ........................... | G06T 5/40 |
| | | | | 382/167 |
| 2019/0122355 A1* | 4/2019 | Xu | ........................ | G06V 10/143 |
| 2022/0383508 A1* | 12/2022 | Liu | ........................ | G06V 10/82 |

\* cited by examiner

*Primary Examiner* — Jonathan A Boyd

(74) *Attorney, Agent, or Firm* — McClure, Qualey & Rodack, LLP

(57) ABSTRACT

A fog discrimination method is disclosed, including a capturing step, a calculation step, and a determining step. The capturing step includes capturing a sub-image of an image. The sub-image includes a light shield body image and a light shield stripe image. The calculation step includes calculating a maximum average grayscale value and a minimum average grayscale value of the sub-image; and calculating a fog function. The fog function is a function of the maximum average grayscale value and the minimum average grayscale value. The determining step includes determining whether the fog function is greater than or less than a threshold; and determining as being fogged when the fog function is less than the threshold.

10 Claims, 4 Drawing Sheets

FOG DISCRIMINATION METHOD AND OPTICAL APPARATUS

CROSS REFERENCE TO RELATED APPLICATIONS

This application claims priority of Taiwan Patent Application No. 111144174, filed on Nov. 18, 2022, the entirety of which is incorporated by reference herein.

BACKGROUND OF THE INVENTION

Field of the Invention

The present disclosure relates to a fog discrimination method and an optical apparatus, in particular to a fog discrimination method and optical apparatus capable of determining whether there is fog and removing the fog.

Description of the Related Art

When using existing optical apparatus in some environments, fog may be generated due to excessive temperature difference, and resulting in unclear images. Especially when existing optical apparatus is used in a humid environment, it tends to cause the images taken by the optical apparatus being unclear due to the temperature difference between the humid environment and the optical apparatus.

Therefore, there is a need for an optical apparatus and a fog discrimination method that may determine whether fog is generated when fog is generated and capable of removing the fog.

BRIEF SUMMARY OF THE INVENTION

An embodiment of the present invention provides a fog discrimination method, including: a capturing step, including: capturing a sub-image of an image, wherein the sub-image includes a light shield body image and a light shield stripe image; a calculation step, including: calculating a maximum average grayscale value and a minimum average grayscale value of the sub-image; and calculating a fog function, wherein the fog function is a function of the maximum average grayscale value and the minimum average grayscale value; and a determining step, including: determining whether the fog function is greater than or less than a threshold; and determining as being fogged when the fog function is less than the threshold.

An embodiment of the present invention provides an optical apparatus, including a panel, a heater, a light shield, a lens, and a processor. The heater is disposed adjacent to the panel. The light shield is disposed on the panel, including a light shield body, and a light shield stripe. The light shield stripe is disposed on the light shield body. The lens is disposed under the panel. The lens generates an image. The processor captures a sub-image of the image. The sub-image includes a light shield body image and a light shield stripe image to obtain a maximum average grayscale value and a minimum average grayscale value of the sub-image. The power of the heater is increased when ((the maximum average grayscale value−the minimum average grayscale value)/(the maximum average grayscale value+the minimum average grayscale value)) is less than a threshold value.

BRIEF DESCRIPTION OF THE DRAWINGS

Various aspects disclosed in the present disclosure may be fully understood from the following detailed description and accompanying drawings. It should be noted that, in accordance with the standard practice in the industry, the various features are not drawn to scale and are used for illustrative purposes only. In fact, the dimensions of the elements may be arbitrarily expanded or reduced to clearly illustrate the features of the present disclosure.

DETAILED DESCRIPTION OF THE INVENTION

Figure 1:
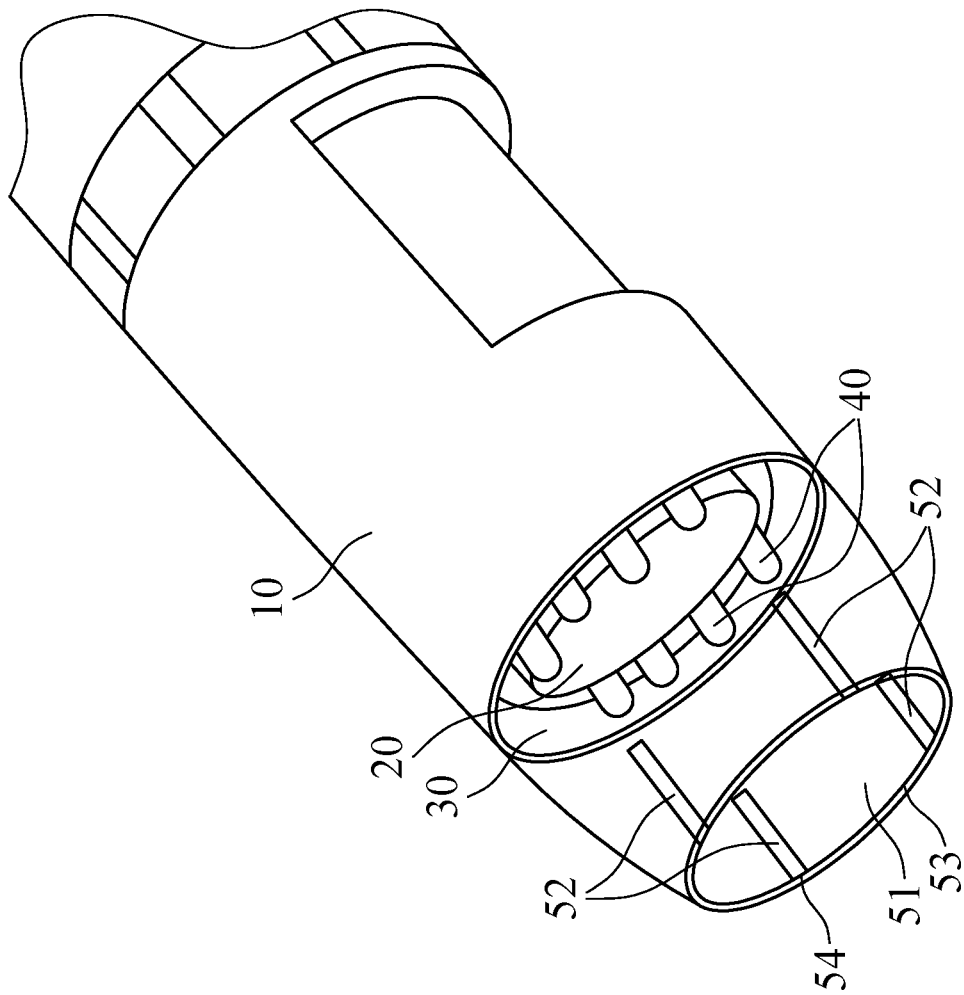
FIG. 1 is a schematic view of an optical apparatus according to some embodiments of the present disclosure.

The present disclosure is described with reference to the accompanying drawings, wherein like symbols are used throughout to indicate similar or identical elements. The drawings are not drawn to scale and are provided solely for illustration of the present disclosure. Several aspects of the present disclosure are described below with reference to illustrative examples and applications. It should be understood that numerous specific details, relationships, and methods are set forth in order to provide a thorough understanding of the present disclosure. However, it will be readily apparent to a person with ordinary skill in the art to which the disclosure belongs that the present disclosure may be practiced without one or more of the specific details or otherwise. In other instances, well-known structures or operations have not been shown in detail to avoid obscuring the present disclosure. The present disclosure is not limited to the illustrated ordering of operations, steps, actions, or events, as some operations, steps, actions, or events may occur in different orders and/or concurrently with other operations, steps, actions, or events. Otherwise, not all illustrated operations, steps, actions, or events are required to implement the method in accordance with the present disclosure. Also, some operations, steps, actions, or events may be omitted or deleted without affecting the implementation of the present disclosure.

Unless otherwise defined, all terms (including technical terms and scientific terms) used herein have the same meaning as commonly understood by those with ordinary knowledge in the technical field to which the present disclosure belongs. Otherwise, terms (e.g., terms defined in commonly used dictionaries) should be construed to have a meaning consistent with their meaning in the context of the relevant field, and unless otherwise defined herein, are not intended to be idealized or too formal to understand the explanation. Furthermore, when "about," "approximately," "substantially," "approximately," etc. are used to describe a number or range of numbers, the term is intended to include numbers that are within ±10% of the stated number, unless otherwise stated. For example, the term "about 5 mm" includes a size range of 4.5 mm to 5.5 mm. Also, as discussed herein, the phrases "about the same," "approximately," "substantially the same," "approximately the same" may refer to dimensions having a variation within ±10% of a base dimension.

It may be understood that although the terms "first", "second", etc. may be used herein to describe various elements, layers and/or sections, these elements, layers and/or sections should not be limited by these terms, and these terms are only used to distinguish between different elements, layers and/or sections. Thus, a first element, layer and/or section discussed below could be termed as a second element, layer and/or section without departing from the teachings of some embodiments of the present disclosure. In addition, for the sake of brevity, terms such as "first" and "second" may not be used in the description to distinguish different elements. Without violating the scope defined by the appended claims, the first element and/or the second element described in the patent claims may be interpreted as any elements in the description that conform to the description.

It should be noted that the drawings of the present disclosure may be part of a apparatus. That is, there may be other external elements around the system of the present disclosure. However, in order to focus the figures of the present disclosure on the system of the present disclosure, the figures of the present disclosure may be drawn with broken lines or thin lines expressed in various forms. Therefore, external elements other than broken lines or thin lines in the figures of the present disclosure may have no influence on the present disclosure unless explicitly stated.

Figure 2:
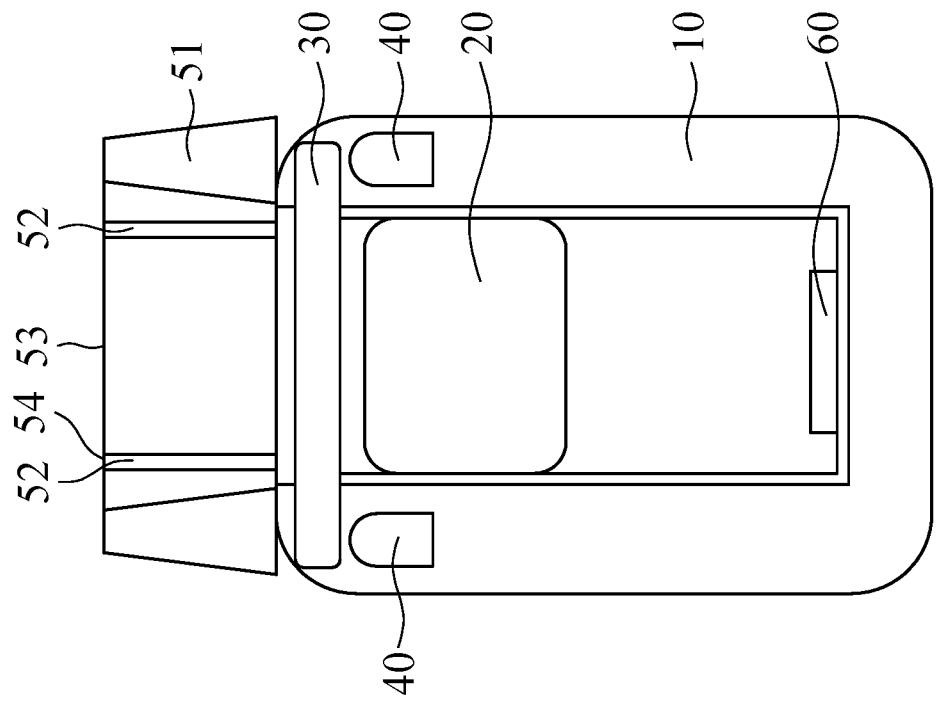
FIG. 2 is a cross-sectional view of an optical apparatus according to some embodiments of the present disclosure.

Firstly, please refer to FIG. 1 and FIG. 2. FIG. 1 is a schematic view of an optical apparatus 100 according to some embodiments of the present disclosure; FIG. 2 is a cross-sectional view of the optical apparatus 100 according to some embodiments of the present disclosure.

As shown in FIG. 1 and FIG. 2, the optical apparatus 100 may include a main body 10, a lens 20, a panel 30, a heater 40, a light shield 50, and a processor 60.

The lens 20 may be disposed at one end of the main body 10, and the lens 20 may be used to photograph the outside and generate an image IM. The image IM may be transmitted to the processor 60 inside the main body 10 for analysis by the processor 60.

The panel 30 may be disposed on the lens 20 to prevent the lens 20 from being directly exposed to the outside. According to some embodiments of the present disclosure, the panel 30 may be a transparent panel. For example, the panel 30 may be a glass panel or a plastic panel.

The heater 40 may be disposed adjacent to the panel 30. According to some embodiments of the present disclosure, the heater 40 may be a light source. For example, the heater 40 may be a light emitting diode (LED) light source.

The heater 40 may heat the panel 30 to maintain or increase the temperature of the panel 30. According to some embodiments of the present disclosure, the processor 60 may control the heater 40 to maintain or increase the temperature of the panel 30. According to some embodiments of the present disclosure, the heater 40 may increase the temperature of the panel 30 to remove the fog on the panel 30.

The light shield 50 may be disposed on the panel 30. The light shield 50 may include a light shield body 51 and a light shield stripe 52.

The light shield body 51 may be disposed around the panel 30, and the light shield body 51 may extend a certain distance away from the panel 30 to prevent undesired light from passing through the panel 30 and entering the lens 20, thereby affecting the quality of the image IM.

Since the light shield body 51 may extend outward away from the panel 30, the image 1M captured by the lens 20 (of an image capture module or image sensor) may include a part of the light shield body 51 (for example, the outer end 53 of the light shield body 51).

The light shield stripe 52 may be disposed on the light shield body 51. According to some embodiments of the present disclosure, the light shield stripe 52 may extend from the outer end 53 of the light shield body 51 toward the panel 30.

Since the light shield stripe 52 may be disposed on the outer end 53 of the light shield body 51, the image 1M captured by the lens 20 may include a part of the light shield stripe 52 (for example, the outer end 54 of the light shield stripe 52).

According to some embodiments of the present disclosure, the light shield stripe 52 may extend from the outer end 53 of the light shield body 51 toward the panel 30 to the panel 30; that is, the light shield stripe 52 may be in contact with the panel 30.

According to some embodiments of the present disclosure, the light shield stripe 52 may extend from the outer end 53 of the light shield body 51 towards the panel 30 for a distance from the panel 30; that is, the light shield stripe 52 may not be in contact with the panel 30.

According to some embodiments of the present disclosure, the light shield body 51 and the light shield stripe 52 may have high contrast. For example, the light shield body 51 may have a white color, while the light shield stripe 52 may have a black color. However, it should be noted that the present disclosure is not limited thereto.

Therefore, in the image IM captured by the lens 20, a light shield body image corresponding to the light shield body 51 and a light shield stripe image corresponding to the light shield stripe 52 also have high contrast.

Figure 3:
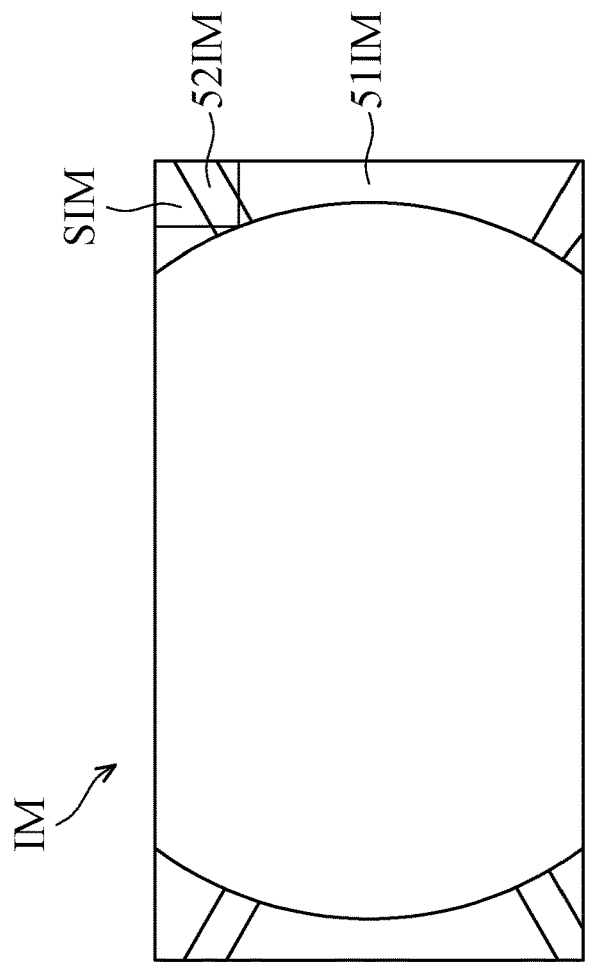
FIG. 3 is a schematic view of an image captured by a lens is processed by a processor according to some embodiments of the present disclosure.
Figure 3:
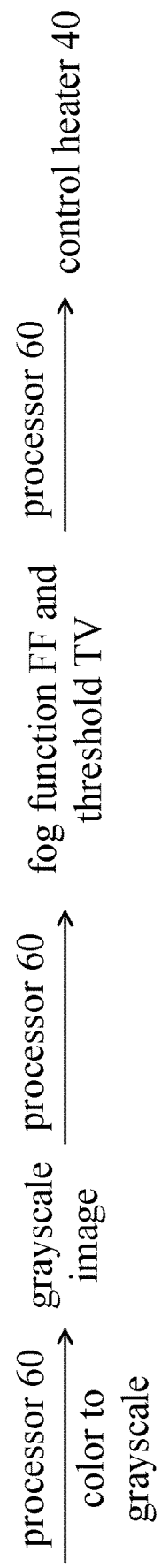

Please refer to FIG. 3, FIG. 3 is a schematic view of an image IM captured by the lens 20 is processed by the processor 60 according to some embodiments of the present disclosure.

As shown in FIG. 3, the processor 60 may receive the image IM captured by the lens 20, and the processor 60 may capture a sub-image SIM of the image IM. The sub-image SIM may include a light shield body image 51IM of the light shield body 51 and a light shield stripe image 52IM of the light shield stripe 52. The sub-image SIM may occupy one or more corner areas of the image IM.

The processor 60 may convert the sub-image SIM from a color image to a grayscale image. According to some embodiments of the present disclosure, the processor 60 may use a color-to-grayscale conversion formula to convert the sub-image SIM into a grayscale image. According to some embodiments of the present disclosure, the color-to-grayscale conversion formula may be: Gray=R×299+G×587+B×114, wherein Gray is the grayscale value, R is the Red value, G is the Green value, and B is Blue value. It should be noted that the color-to-grayscale conversion formula of the present disclosure is not limited thereto.

Since the sub-image SIM includes a plurality of pixels, after converting the sub-image SIM into a grayscale image, the processor 60 may obtain a plurality of grayscale values. The processor 60 may obtain a maximum average grayscale value LAG and a minimum average grayscale value SAG of the sub-image SIM.

The maximum average grayscale value LAG of the sub-image SIM may be the average of the range of maximum grayscale values of the sub-image SIM. According to some embodiments of the present disclosure, the range may be a ratio or a number.

For example, when the range is a ratio, the maximum average grayscale value LAG of the sub-image SIM may be the average of the largest 40% of the grayscale values of the sub-image SIM.

For example, when the range is a number and the sub-image SIM totally includes 50 pixels, the maximum average grayscale value LAG of the sub-image SIM may be the average of the largest 20 grayscales values of the grayscale values of the sub-image SIM.

However, it should be noted that the ranges are not limited to the foregoing examples, for example, the range could be 5%, 10%, 15%, 20%, 25%, 30%, 35%, 40%, 45%, or 50%, etc.; and the range may also be 5, 10, 15, 20, 25, 30, 35, 40, 45, or 50, etc.

The minimum average grayscale value SAG of the sub-image SIM may be an average of the range of minimum grayscale values of the sub-image SIM. According to some embodiments of the present disclosure, the range may be a ratio or a number.

For example, when the range is a ratio, the minimum average grayscale value SAG of the sub-image SIM may be the average of the smallest 40% of the grayscale values of the sub-image SIM.

For example, when the range is a number and when the sub-image SIM totally includes 50 pixels, the minimum average grayscale value SAG of the sub-image SIM may be the average of the smallest 20 grayscale values among the grayscale values of the sub-image SIM.

However, it should be noted that the ranges are not limited to the foregoing examples, for example, ranges could be 5%, 10%, 15%, 20%, 25%, 30%, 35%, 40%, 45%, or 50%, etc.; the range may also be 5, 10, 15, 20, 25, 30, 35, 40, 45, or 50, etc.

The processor 60 may have a threshold TV, and the threshold TV may be set in the processor 60 in advance. According to some embodiments of the present disclosure, the threshold TV may be between 0.1 and 1. According to some embodiments of the present disclosure, the threshold TV may be between 0.3 and 0.8. According to some embodiments of the present disclosure, the threshold TV may be 0.6.

The processor 60 may calculate a fog function FF. The fog function FF may be: (maximum average grayscale value LAG−minimum average grayscale value SAG)/(maximum average grayscale value LAG+minimum average grayscale value SAG).

When the fog function FF is less than the threshold TV (((LAG−SAG)/(LAG+SAG))<TV), the processor 60 may determine that the panel 30 is fogged, and the processor 60 may control the heater 40 to increase the power of the heater 40 to increase the temperature of the panel 30. When the temperature of the panel 30 increases, the fog on the panel 30 may be effectively removed, so that the lens 20 may capture clear images.

When the fog function FF is greater than the threshold TV (((LAG−SAG)/(LAG+SAG))>TV), the processor 60 may determine that the panel 30 is not fogged, and the processor 60 may control the heater 40 to maintain, reduce the power of the heater 40 or even turn off the heater 40 to maintain or reduce the temperature of the panel 30. When the temperature of the panel 30 is maintained or reduced, the power consumption of the heater 40 may be maintained or reduced, and thus the operating cost of the optical apparatus 100 may be maintained or reduced.

According to some embodiments of the present disclosure, the light shield 50 may include a plurality of light shield stripes 52 that are disposed on the light shield body 51. The light shield stripes 52 may be disposed such that the light shield stripe images 52IM are evenly distributed around the periphery of the image IM.

For example, the light shield stripes 52 may be disposed such that the light shield stripe images 52IM are evenly distributed at the corners of the image IM. For example, the light shield stripes 52 may be disposed such that the light shield stripe images 52IM are distributed at the corners of the image IM and/or in the middle of its long sides.

According to some embodiments of the present disclosure, the processor 60 may capture a plurality of sub-images SIM (for example, four corners) of the image IM, and obtain each of the maximum average grayscale value LAG and each of the minimum average grayscale value SAG of each of sub-images SIM.

The processor 60 may calculate the fog function FF for each of sub-images SIM. The fog function FF may be: (maximum average grayscale value LAG−minimum average grayscale value SAG)/(maximum average grayscale value LAG+minimum average grayscale value SAG).

When any fog function FF of the sub-images SIM is less than the threshold TV (((LAG−SAG)/(LAG+SAG))<TV), the processor 60 may determine that the panel 30 is fogged, and the processor 60 may control the heater 40 to increase the power of the heater 40 to increase the temperature of the panel 30. When the temperature of the panel 30 increases, the fog on the panel 30 may be effectively removed, so that the lens 20 may capture clear images.

When all fog functions FF of the sub-images SIM are greater than the threshold TV (((LAG−SAG)/(LAG+SAG))>TV), the processor 60 may determine that the panel 30 is not fogged, and the processor 60 may control the heater 40, to maintain the power of the heater 40 to maintain the temperature of the panel 30. When the temperature of the panel 30 is maintained, the panel 30 may be effectively kept from fogging, so that the lens 20 may capture clear images.

Figure 4:
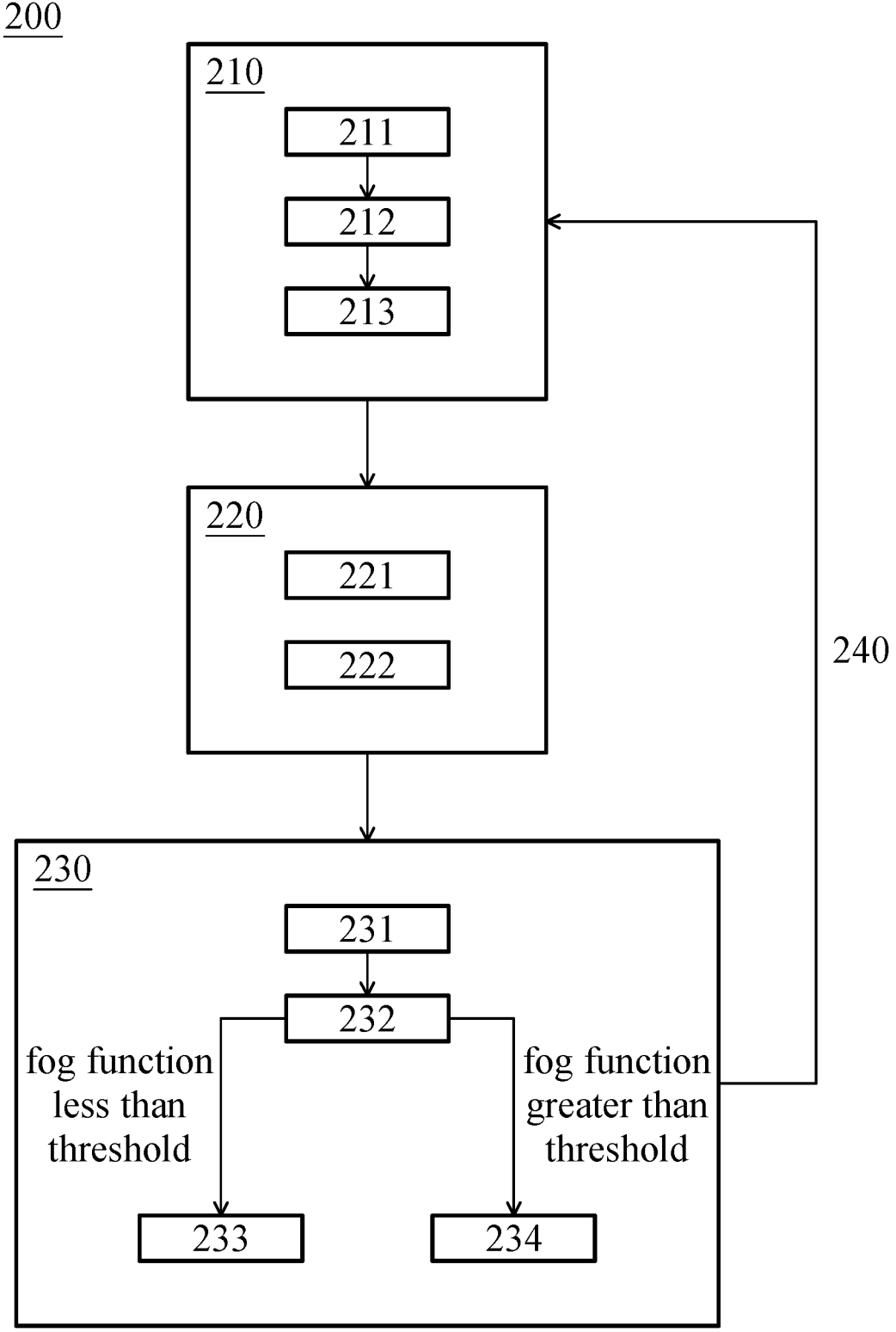
FIG. 4 is a schematic view of a fog discrimination method according to some embodiments of the present disclosure.

Please refer to FIG. 4, FIG. 4 is a schematic view of a fog discrimination method 200 according to some embodiments of the present disclosure.

The fog discrimination method 200 may start with a capturing step 210. The capturing step 210 may include a step 211. In the step 211, a lens (of an image capture module or image sensor) is used to capture an image.

According to some embodiments of the present disclosure, the lens used in the fog discrimination method 200 may be the aforementioned lens 20; and the image may be the aforementioned image IM.

Then, it may proceed to step 212. In the step 212, a sub-image of the image is captured. According to some embodiments of the present disclosure, the sub-image may include a light shield body image and a light shield stripe image.

According to some embodiments of the present disclosure, the light shield body image and the light shield stripe image may have high contrast. For example, the light shield body may have a white color while the light shield stripe may have a black color.

According to some embodiments of the present disclosure, in the fog discrimination method 200, the sub-image may be the aforementioned sub-image SIM; the light shield body image may be the aforementioned light shield body image 51IM; the light shield stripe image may be the aforementioned light shield stripe image 52IM.

Then, it may proceed to step 213. In the step 213, the sub-image is converted from a color image to a grayscale image. According to some embodiments of the present disclosure, the sub-image is converted into a grayscale image using a color-to-grayscale conversion formula. According to some embodiments of the present disclosure, the color-to-grayscale conversion formula may be: Gray=R× 299+G×587+B×114, wherein Gray is the grayscale value, R is the Red value, G is the Green value, and B is Blue value.

It should be noted that the color-to-grayscale conversion formula of the present disclosure is not limited thereto.

After that, it may proceed to a calculation step 220. The calculation step 220 may include step 221. In the step 221, a maximum average grayscale value and a minimum average grayscale value of the sub-images are calculated.

The maximum average grayscale is average of the range of maximum grayscale values of the sub-image. According to some embodiments of the present disclosure, the range may be a ratio or a number.

The minimum average grayscale value is average of the range of minimum grayscale values of the sub-image. According to some embodiments of the present disclosure, the range may be a ratio or a number.

According to some embodiments of the present disclosure, in the fog discrimination method 200, the maximum average grayscale value may be the aforementioned maximum average grayscale value LAG; and the minimum average grayscale value may be the aforementioned minimum average grayscale value SAG.

Then, it may proceed to step 222. In the step 222, a fog function may be calculated. According to some embodiments of the present disclosure, the fog function is a function of the maximum average grayscale value and the minimum average grayscale value.

According to some embodiments of the present disclosure, the fog function may be: (maximum average grayscale value−minimum average grayscale value)/(maximum grayscale value+minimum average grayscale value).

According to some embodiments of the present disclosure, in the fog discrimination method 200, the fog function may be the aforementioned fog function FF.

Afterwards, it proceed to a determining step 230. The determining step 230 may include step 231. In the step 231, a threshold may be set.

According to some embodiments of the present disclosure, the threshold may be between 0.1 and 1. According to some embodiments of the present disclosure, the threshold may be between 0.3 and 0.8. According to some embodiments of the present disclosure, the threshold may be 0.6.

According to some embodiments of the present disclosure, in the fog discrimination method 200, the threshold may be the aforementioned threshold TV.

Next, it may proceed to step 232. In the step 232, it is determined whether the fog function is greater than or less than a threshold.

After the step 232, it may proceed to step 233. In the step 233, when the fog function is less than the threshold, it is determined as being fogged, and the heating intensity is increased.

According to some embodiments of the present disclosure, determining as being fogged may be determining that a panel above the lens is fogged. According to some embodiments of the present disclosure, increasing the heating intensity may be increasing the heating intensity of a heater under the panel, so as to increase the temperature of the panel.

According to some embodiments of the present disclosure, in the fog discrimination method 200, the panel may be the aforementioned panel 30; and the heater may be the aforementioned heater 40.

After the step 232, it may also proceed to step 234. In the step 234, when the fog function is greater than the threshold, it is determined as not fogged, and the heating intensity is maintained, reduced or turned off.

According to some embodiments of the present disclosure, determining that "not fogged" may be judging that the panel above the lens is not fogged. According to some embodiments of the present disclosure, maintaining or reducing the heating intensity may be maintaining or reducing the heating intensity of the heater under the panel, so as to maintain or reduce the temperature of the panel.

The fog discrimination method 200 may further include a loop step 240. The loop step 240 may include repeating the capturing step 210, the calculation step 220, and the determining step 230.

According to some embodiments of the present disclosure, in the step 212, a plurality of sub-images of the image may be captured, and each of sub-images may include a light shield body image and a light shield stripe image.

According to some embodiments of the present disclosure, the step 213, the step 221, the step 222, the step 231, and the step 232 may be implemented for each of sub-images.

According to some embodiments of the present disclosure, in the step 233, when the fog function of any sub-image is less than the threshold, it is determined as being fogged, and the heating intensity is increased.

According to some embodiments of the present disclosure, in step 234, when all the fog functions of each sub-images are greater than the threshold, it is determined as not fogged, and the heating intensity is maintained or reduced.

In general, the optical apparatus and the fog discrimination method of the embodiments of the present disclosure may determine whether the panel above the lens is fogged, and change the temperature of the panel by controlling the power of the heater, thereby achieving the function of automatic defogging. The optical apparatus and the fog discrimination method of the embodiments of the present disclosure may quickly, accurately, and continuously automatically defog, so that the lens may continuously capture clear images.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. A fog discrimination method, comprising:
    a capturing step, comprising:
        capturing a sub-image of an image, wherein the sub-image comprises a light shield body image and a light shield stripe image;
    a calculation step, comprising:
        calculating a maximum average grayscale value and a minimum average grayscale value of the sub-image; and
        calculating a fog function, wherein the fog function is a function of the maximum average grayscale value and the minimum average grayscale value; and
    a determining step, comprising:
        determining whether the fog function is greater than or less than a threshold; and
        determining as being fogged when the fog function is less than the threshold.

2. The fog discrimination method as claimed in claim 1, wherein the maximum average grayscale value is obtained by averaging of a range of maximum grayscale values of the sub-image, and the minimum average grayscale value is obtained by averaging of a range of minimum grayscale values of the sub-image.

3. The fog discrimination method as claimed in claim 1, wherein the fog function is: (the maximum average grayscale value−the minimum average grayscale value)/(the maximum average grayscale value+the minimum average grayscale value).

4. The fog discrimination method as claimed in claim 1, wherein the capturing step further comprises:
    converting the sub-image to a grayscale image.

5. The fog discrimination method as claimed in claim 1, wherein the light shield body image and the light shield stripe image have high contrast.

6. The fog discrimination method as claimed in claim 1, wherein the determining step further comprises:
    determining as not fogged when the fog function is greater than the threshold.

7. An optical apparatus comprising:
    a panel;
    a heater, disposed adjacent to the panel;
    a light shield, disposed on the panel, comprising:
        a light shield body; and
        a light shield stripe, disposed on the light shield body;
    a lens, disposed under the panel, wherein the lens generates an image; and
    a processor, capturing a sub-image of the image, wherein the sub-image comprises a light shield body image and a light shield stripe image to obtain a maximum average grayscale value and a minimum average grayscale value of the sub-image,
    wherein the power of the heater is increased when ((the maximum average grayscale value−the minimum average grayscale value)/(the maximum average grayscale value+the minimum average grayscale value)) is less than a threshold value.

8. The optical apparatus as claimed in claim 7, wherein the power of the heater is maintained when ((the maximum average grayscale value−the minimum average grayscale value)/(the maximum average grayscale value+the minimum average grayscale value)) is greater than the threshold value.

9. The optical apparatus as claimed in claim 7, wherein the maximum average grayscale value is obtained by averaging of a range of maximum grayscale values of the sub-image,
    wherein the minimum average grayscale value is obtaining by averaging of a range of minimum grayscale values of the sub-image.

10. The optical apparatus as claimed in claim 7, wherein the light shield comprises a plurality of light shield stripes disposed on the light shield body,
    wherein the processor captures a plurality of sub-images of the image to obtain a maximum average grayscale value and a minimum average grayscale value of each of the sub-images,
    wherein the power of the heater is increased to increase the temperature of the panel when any one of ((the maximum average grayscale value−the minimum average grayscale value)/(the maximum average grayscale value+the minimum average grayscale value)) of the sub-images is less than the threshold value.

* * * * *